United States Patent [19]

Ellzey

[11] 4,326,622

[45] Apr. 27, 1982

[54] COOPERATIVE ESCALATOR AND WHEEL CHAIR

[76] Inventor: Floyd P. Ellzey, 2301 Marshallfield La., Redondo Beach, Calif. 90278

[21] Appl. No.: 215,417

[22] Filed: Dec. 11, 1980

[51] Int. Cl.[3] ........................... B66B 9/12; B62B 9/10

[52] U.S. Cl. ........................................ 198/322; 198/324; 198/326; 198/333; 280/5.28; 280/6 R; 280/289 WC; 297/DIG. 4

[58] Field of Search ............... 198/321, 322, 323, 324, 198/326, 333; 280/5.2, 5.3, 5.28, 6 R, 242 WC, 289 WC; 104/25; 180/DIG. 3; 297/DIG. 4

[56] References Cited

U.S. PATENT DOCUMENTS 3,905,437 9/1975 Kaiho et al. ..................... 280/5.3 X
4,235,327 11/1980 Heusler et al. ...................... 198/326

FOREIGN PATENT DOCUMENTS 2009806 10/1970 Fed. Rep. of Germany ...... 198/326
2719394 11/1978 Fed. Rep. of Germany ...... 198/333
2242314 3/1975 France ................................ 198/321
1217098 12/1970 United Kingdom ................ 198/326

*Primary Examiner*—Jeffrey V. Nase
*Attorney, Agent, or Firm*—William H. Maxwell

[57] ABSTRACT

The combination of an escalator and a wheel chair, the escalator having side walls between which an endless belt of flights is moved, there being a track extending between lower and upper platforms at which at least one has one or more control gates to govern the escalator speed, the wheel chair having spaced side frames with main wheel supports spaced from downwardly extensible front wheel supports and controlled in response to the track to depress said front wheel supports to maintain the horizontal disposition of the wheel chair during vertical displacement of the flights when transported between said platforms.

93 Claims, 23 Drawing Figures

FIG. 3.
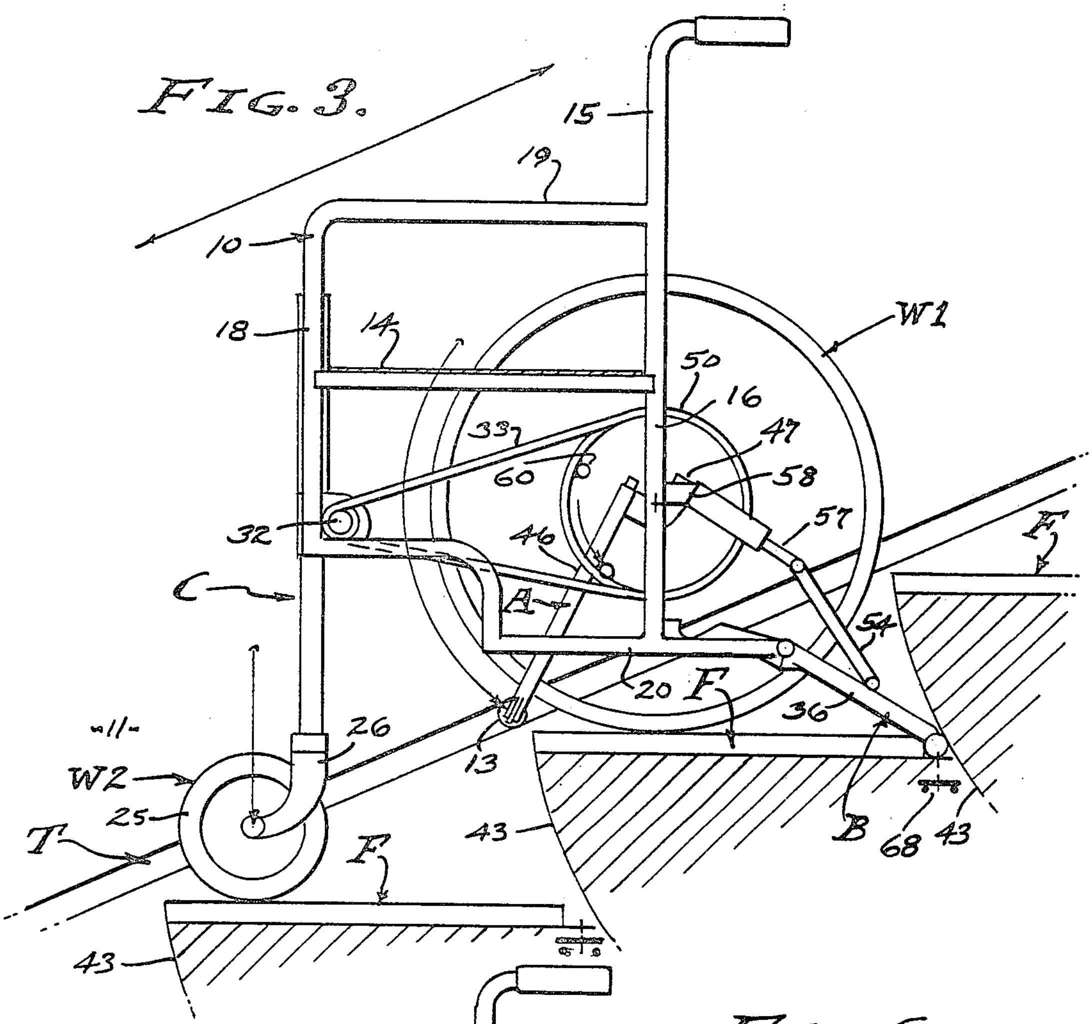
FIG. 5.
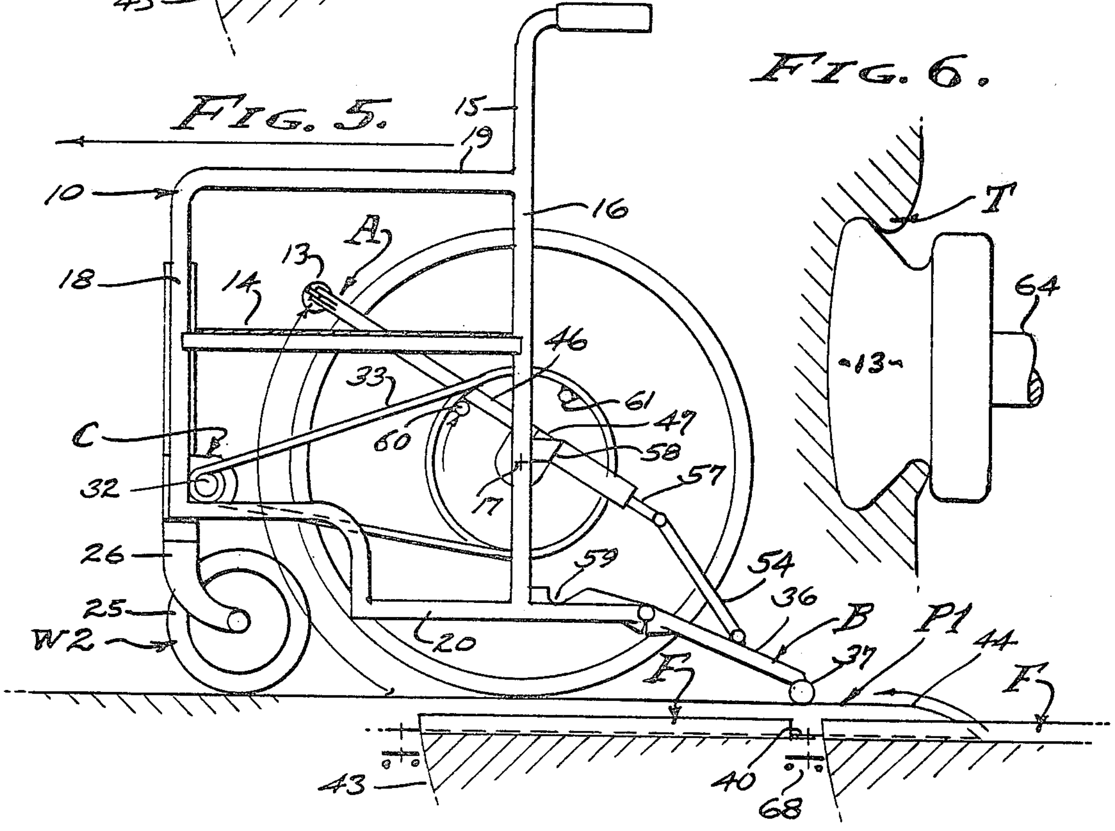
FIG. 6.

COOPERATIVE ESCALATOR AND WHEEL CHAIR

This application is copending with application Ser. Nos. 215,419 and 215,418 filed Dec. 11, 1980, both now abandoned, on even date herewith and entitled Wheel Chair for Escalator Transport and Escalator for Wheel Chair Transport, respectively.

BACKGROUND

The mobility of wheel chaired persons has become an important consideration, so that their participation in society can be fulfilled. In addition to horizontal transport it is necessary to ascend to elevated levels, for example to the various floors of building structures and the like; and for this purpose escalators are employed. However, escalators comprising an inclined or declined series of treads or flights that are linked in an endless belt have been devoid of features that will permit the transport of wheel chairs thereon, it being a general object of this invention to provide a wheel chair and escalator combination whereby wheel chaired persons can ascend and descend between structure levels serviced thereby.

Wheel chairs are characteristically a collapsible framework comprised of a pair of complementary side frames that separate to form a seat. Each frame has a main supporting wheel of large diameter and with a hand rim to be turned by the person seated thereon, and has a secondary leveling wheel of small diameter castered so as to permit steering. It is an object of this invention to coordinate the smaller leveling wheel with the inclination of the escalator stairs or flights in order to maintain a level condition of said wheel chair. In practice, the main supporting wheels engage one escalator flight while the leveling wheels engage the next lower flight. It is also an object to coordinate the leveling action of said leveling wheel with the degree of ascension and descension of the escalator flights as they depart from a structure level for UP and DOWN transport as the case may be.

The side frames of wheel chairs are necessarily narrow for collapsibility into a small space, there being cross bracing or a scissors-type means (not shown) to separate them in vertical alignment with respect to a supporting surface. It is an object of this invention to maintain the narrow configuration of the side frame and wheel assembly, while incorporating therein means by which the leveling wheels are controllably depressed in order to preserve a horizontal condition of the chair seat.

Heretofore, the wheeled carriage of wheel chairs have maintained parallelism with respect to the supporting surface. With the present invention it is an object to maintain a horizontal seat disposition with respect to offset supporting surfaces that are parallel. Accordingly, one wheeled support is controllably depressed with respect to the other, and preferably the front castered wheels are extended from the frames. In carrying out this invention, a lever means responsive to a track at the side wall of the escalator controllably depresses the wheels so as to engage them with the lowered escalator flight.

The wheeled support of a wheel chair upon vertically displaced flights of an escalator poses a problem with respect to safety. That is, an assurance that the wheel chair will remain positioned upon said flight to move therewith, and without rolling off and/or tumbling out of control. To this end, it is an object of this invention to provide reliable anchor means coordinated with the aforementioned lever means to capture the wheel chair in position for transport upon a pair of adjacent escalator flights.

The foregoing objectives are embodied in a wheel chair of conventional design, and adapted to manual operation by the person transported thereby. The escalator is provided with cooperative tracking means and anchor means, and motion control means, whereby anchored engagement of the wheel chair to the escalator can be established. To this end, gate positions are established where the wheel chair is engageable with a flight of the escalator, by slowing or stopping the escalator momentarily for coupling to said anchor means. In practice, switch means are provided for sequential stopping (slowing) and starting of the escalator in the reception of wheel chaired persons for transport thereby. The release of the wheel chair from the escalator flights is automatic, it being an object herein to provide means by which the anchor means releases at the discharge end of the escalator.

It is a general object of this invention to provide simple, practical and durable means incorporated in a conventional wheel chair to accomplish the aforesaid objectives, and to provide complementary features in the escalator mechanism which are safe and acceptable. The relationship of wheel chair and escalator features is uncomplicated and characterized by direct and positive rules of action.

SUMMARY OF THE INVENTION

This invention relates to the transport of wheel chaired persons via escalators to ascend and descend between the floor levels of building structures and the like. The wheel chair is conventional in every respect except for the additional features herein disclosed. Likewise, the escalator is conventional in every respect except for the additional features applied thereto in order to complement the said wheel chair features to be controlled thereby. The wheel chair is provided with lever means A for depression of the front wheel support W2 in response to track means T in the escalator. The wheel chair is also provided with anchor means B for coupled engagement with a flight F of the escalator, said escalator flight being provided with complementary anchor means therefor. A feature is the releasible engagement of the complementary anchor means, and the commitment to control by the track means T and lever means A. The characteristic feature is the horizontal level at which the wheel chair is maintained throughout the transport by the escalator, while ascending and descending.

The foregoing and other various features and objects of this invention will be apparent and fully understood from the following detailed description of the typical preferred forms and applications thereof, throughout which description reference is made to the accompanying drawings.

FIG. 3 is a view similar to FIG. 2 showing the ascending and/or descending condition of the wheel chair in combination with the flights of the escalator.

FIG. 5 is a view similar to FIG. 1 showing the wheel chair in combination with and departing from the flights of the escalator.

FIG. 6 is an enlarged detailed view of the follower and track engagement that controls depression of the wheel support W2.

PREFERRED EMBODIMENT

Figure 1:
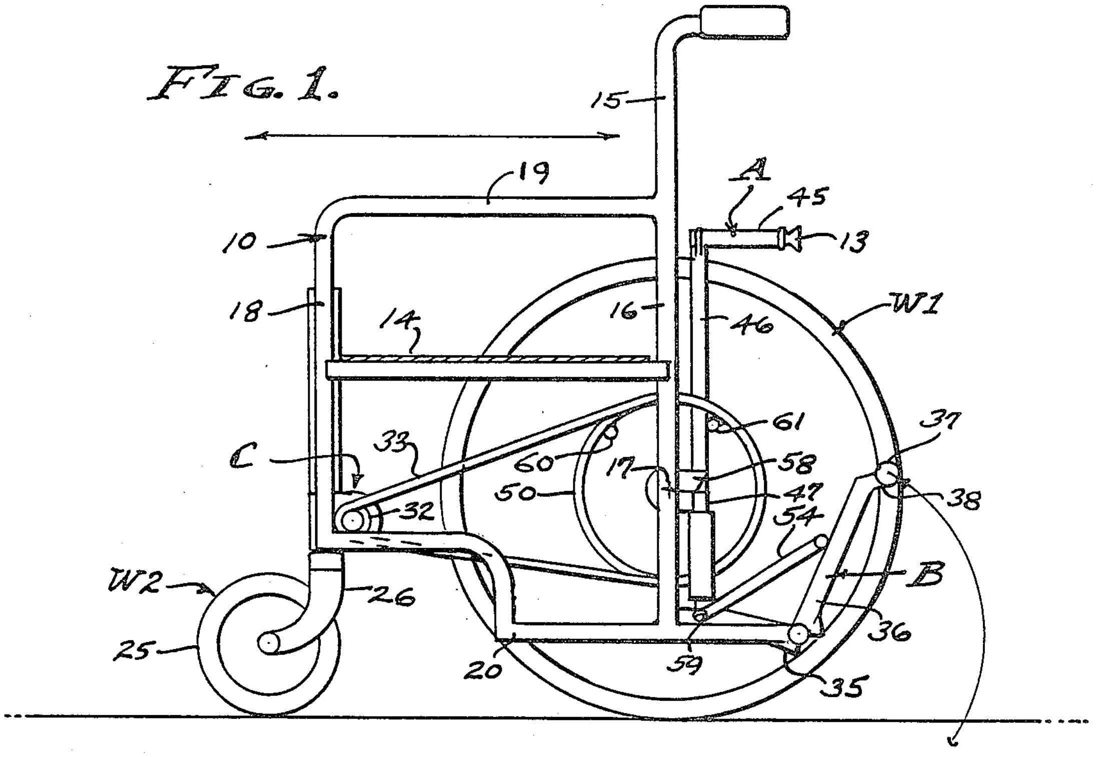
FIG. 1 is a side elevation view of a wheel chair embodying the features of the present invention, the chair being conditioned for normal use.

The escalator and wheel chair concept herein disclosed involves additional features applied to the wheel chair and to the escalator, features which are complementary for ascent and descent of wheel chairs by escalators. Generally: the wheel chair is comprised of side frames 10 with a main wheel support W1 and a front wheel support W2, and to which is added the lever means A, anchor means B, and lift means C; and the escalator is comprised of lower level and upper level platforms P1 and P2 between which treads of flights F are transported by means of an endless belt of articulated links (not shown). The escalator is conventional in every respect, except for the horizontal disposition of several flights F in the plane of the upper platform P2 preparatory to descent. The escalator is driven by a motor M under control of gate means as will be described. The transport of the escalator is either UP or DOWN and the descent or ascent thereby is between the platforms P1 and P2 at separated floor levels. As shown, the flights F ascend and descend between side walls 11 along which moving hand rails 12 are associated with the flights. A feature of this invention is the track T at the walls 11 to receive a follower 13 for operation of the lever means A. The gate means for escalator control is associated with the track T.

Referring now to the wheel chair as it is shown herein, there are two side frames 10 between which a seat 14 extends in a horizontal plane spaced above the supporting surface. It is to be understood that there is such a frame at each side of the wheel chair and that outside of each side frame there is a main wheel support W1 positioned at the back 15 of the chair and aft of the center of gravity when a person is seated therein. As shown, there is a vertical leg member 16 from which a supporting axle 17 projects to carry the main wheel support W1. Forward of the member 16 there is a vertical leg member 18 from which the front wheel support W2 depends. The members 16 and 18 are rigidly connected by an upper arm 19 and by a lower rail 20 that extends rearward of the member 16 to terminate just within the perimeter of the wheel support W1. The bracing by which the two side frames 10 are held in spaced vertical positions is not shown herein and is conventional so as to position the two side wheels W1 close to the walls 11 of the escalator and for engagement of the two followers 13 in the two tracks T.

Figure 7:
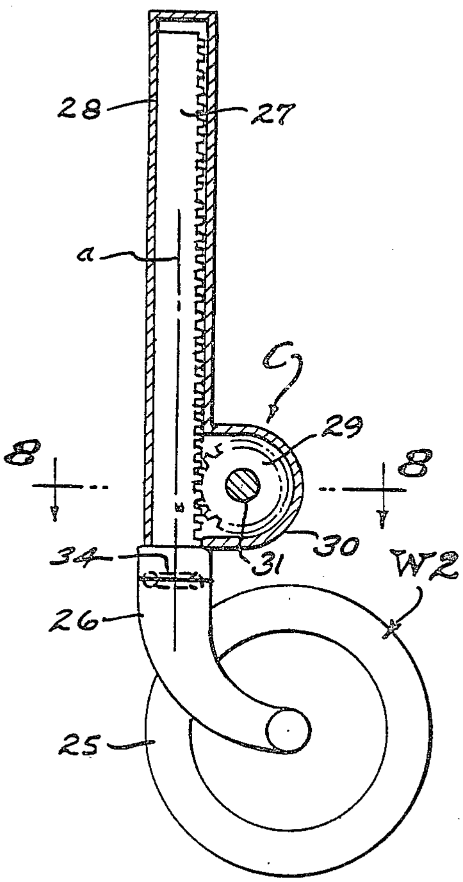
FIG. 7 is an enlarged sectional view of the wheel support W2.
Figure 8:
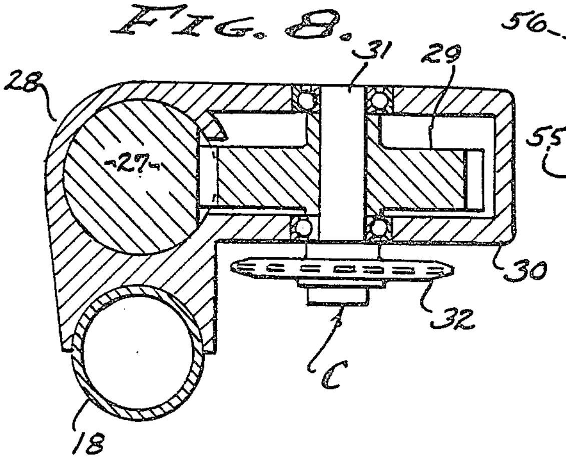
FIG. 8 is an enlarged detailed sectional view thereof taken as indicated by line 8—8 on FIG. 7.

The front wheel support W2 is extensible through operation of the lift means C, which in its preferred form is a rack and pinion jack operable along the caster axis a of a front wheel 25 carried by a swivally mounted fork 26, all of which is disposed well forward of the center of gravity and outside of the side frame 10. The rack 27 telescopes into a cover tube 28 to mesh with the pinion 29 that operates within a case 30 (see FIGS. 7-8). The pinion shaft 31 carries a sprocket 32 inboard of the case 30 and outboard of the leg members 16 and 18. A drive chain 33 engages over sprocket 32 to lower and raise the rack 27, the lowermost end of which carries the fork 26 on swival bearings 34. The extreme positions of the extensible rack 27 of lift means C is shown in FIGS. 1 and 3.

Figure 9:
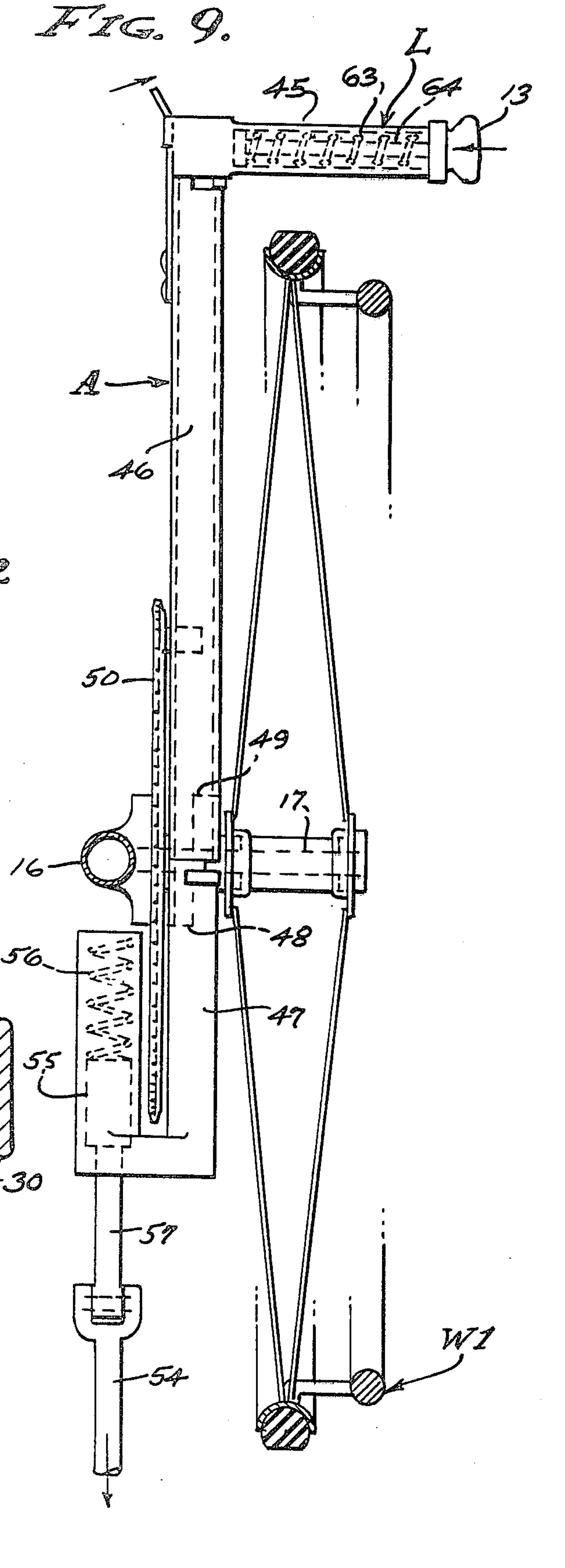
FIG. 9 is an enlarged sectional view taken as indicated by line 9—9 on FIG. 2.
Figure 10:
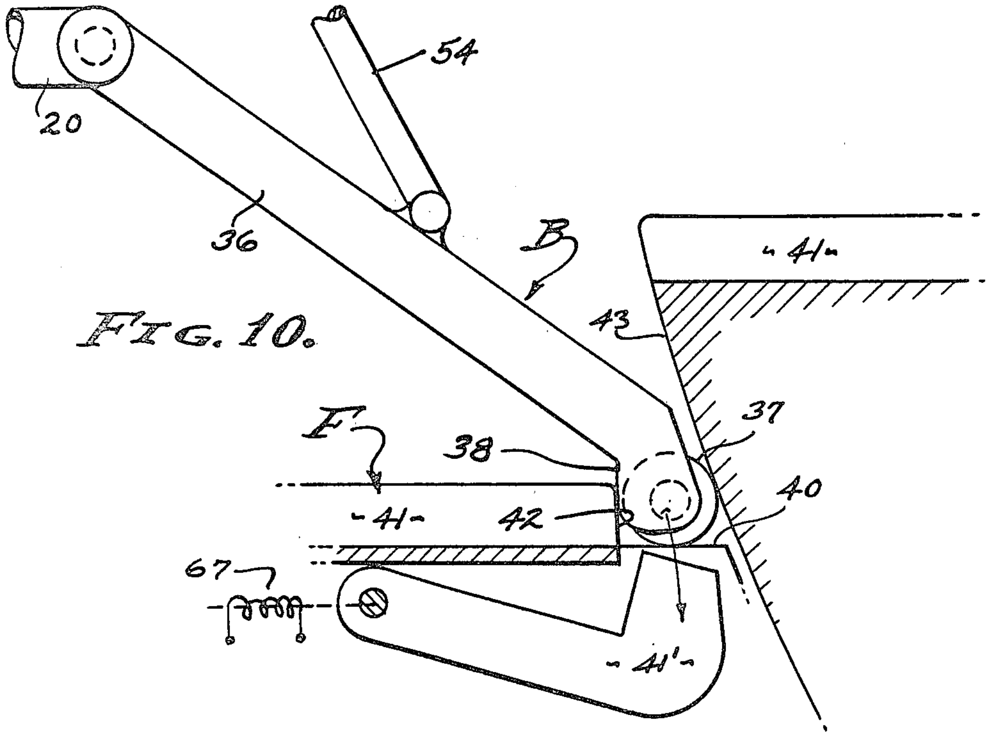
FIG. 10 is an enlarged detailed view of the first form of anchor means B shown as it is engaged with the escalator.

The anchor means B as it is disclosed in FIGS. 1-13 and 16 is extensible through operation of the lever means A to be releasibly engaged by the flights F of the escalator, the flights being provided with pockets 40 for the reception of said anchor means A. In practice, there is an anchor means A at each side frame 10 and comprised of an arm 36 pivoted on a transverse horizontal axis from the rear extremity of the frame rail 20, to retractably swing into engagement with the escalator flights. A feature is the roller 37 at the terminal end of arm 36, and the forwardly disposed hook 38 on the arm to engage in a flight pocket 40. As shown in FIG. 10 the pocket 40 receives both the roller 37 and hook 38, the roller being engageable with next adjacent flight F and the hook 38 having a face engageable with the opposing wall of the pocket 40. In carrying out this invention, the arm 36 is lowered 35° or more to a stop 35 and below the horizontal of rail 20 for engagement in a pocket 40, and the arm is alternately raised 65° or more above said horizontal when not in use (see FIGS. 3 and 1 for comparison).

Figure 4:
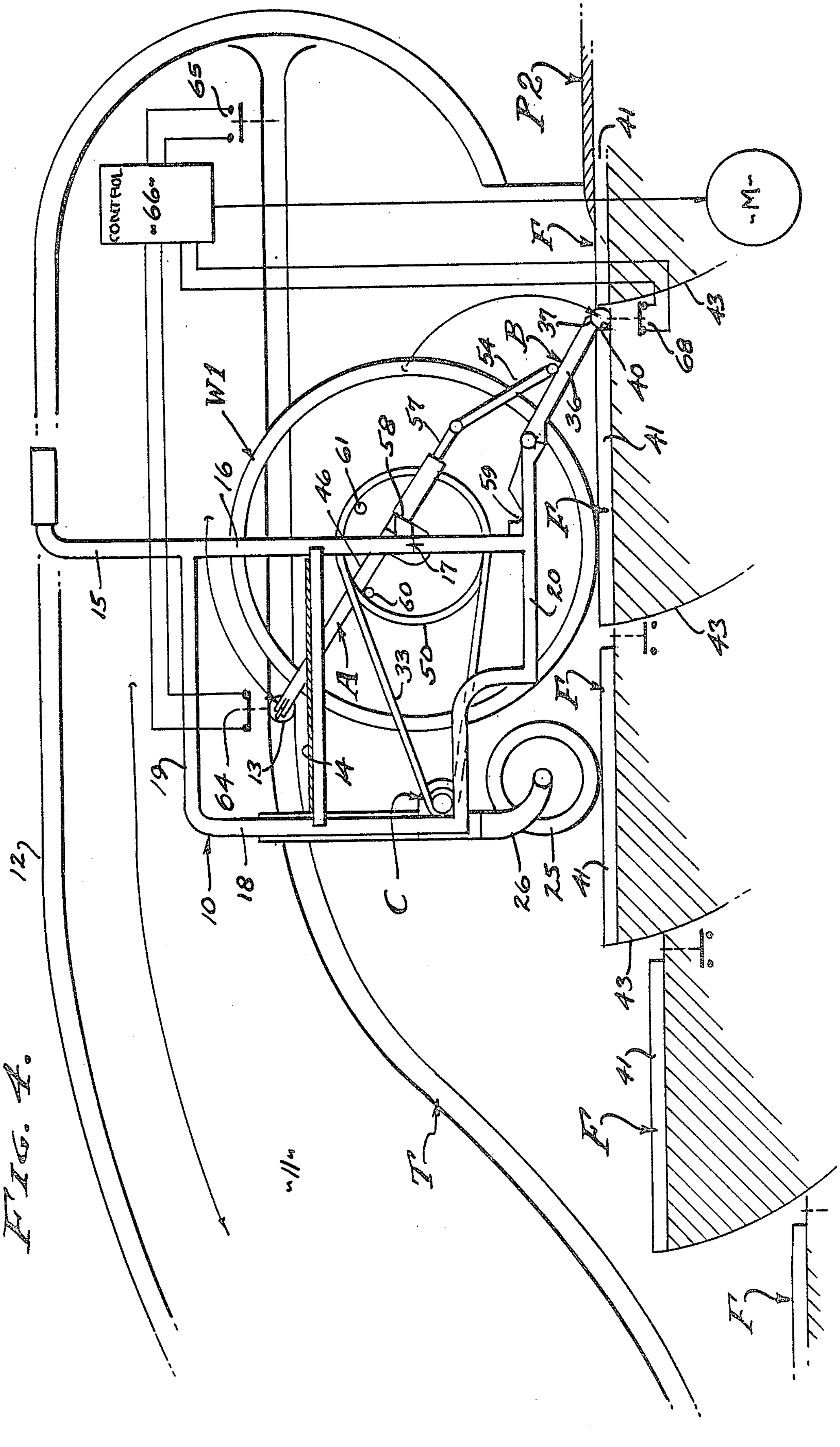
FIG. 4 is a view similar to FIG. 1 showing the wheel chair in combination with and received by the flights of an escalator preliminary to descent.

Referring now to the pocket or pockets 40, there is such a pocket at each side of each flight F at the innermost edge or corner of the tread defined by the next adjacent flight riser 43. These spaced pockets 40 are positioned to align with the spaced rails 20 of the side frames 10, and with the anchor means arms 36 to receive hooks 38 and rollers 37 thereof. The conventional ribbed or grooved tread of the escalator flights F is provided with longitudinal fins 41 of a height at least one half the roller diameter (see FIGS. 10 and 16), to form said anchor pocket 40. The pocket 40 is formed or opened by retraction of a fin section 41', as shown in FIG. 10. Accordingly, one or more fin sections 41' are retracted to form the pocket with a face 42 to oppose the hook face 38, while the roller 37 is engageable with the riser 43 of the adjacent flight when it is raised as shown in FIGS. 3, 4 and 10. As best illustrated in FIG. 10, rising of said adjacent flight F relative to the next lower flight F establishes a convergence that captures the roller 37 and hook 38 configuration. Conversely, as shown in FIG. 5 the terminous fingers 44 continue from the fins 41 at the platforms P1 and P2, as the case may be, and are inclined to operate between the fins 41 so as to intercept the rollers 37 and withdraw them from the pockets 40 automatically. As shown in FIG. 5 of the drawings, the roller 37 has been withdrawn from the pocket 40 and automatically raised to the supporting plane of the lower floor platform P1 at the terminous of a descending escalator. Conversely, the roller 37 is automatically raised to the supporting plane of the upper floor platform P2 at the terminous of an ascending escalator.

Referring now to the lever means A, the purpose thereof is twofold. Firstly, lever means A manually swings the arm 36 so as to engage the roller 37 and hook 38 into the escalator flight and to depress the same into the pocket 40. Secondly, lever means A follows the track T so as to operate the lift means C to extend the front wheel support W2 commensurate with the vertical displacement between adjacent supporting flights. As shown for example in FIGS. 1–5 of the drawings, the wheel chair is maintained horizontal over one or more supporting surfaces, and characteristically when the wheel supports W1 and W2 are supported by vertically displaced flights F. Sequentially therefore, the lever means A is manually operable to depress the anchor means B into engagement with a flight F to enter a pocket therein, and is then simultaneously separable and engageable with the track T and operated thereby to extend the front wheel support W2 according to the vertical displacement between flights F. As shown, the aforementioned follower 13 is made part of the lever means A and is incorporated in an extensible handle 45 thereof to be engageable in said track T.

The lever means A is comprised of a separable first class lever that converts into a second class lever. The first class condition thereof as shown in FIG. 1 has its two arm members 46 and 47 locked together as one, by means of the lock features of FIGS. 12 and 13. The second class condition thereof as shown in FIGS. 2–5 has said two members 46 and 47 unlocked, by virtue of turning the handle 45 outwardly as shown. In carrying out this invention, the lever means A has the axle 17 for its fulcrum, being disposed between the side frame 10 and main wheel support W1. Refer to FIG. 9 wherein the arm members 46 and 47 are shown as rotatable on independent hubs 48 and 49, and wherein a drive sprocket 50 is adjacent thereto and free to rotate on said axle 17 immediately outboard of the frame leg 16.

Figure 11:
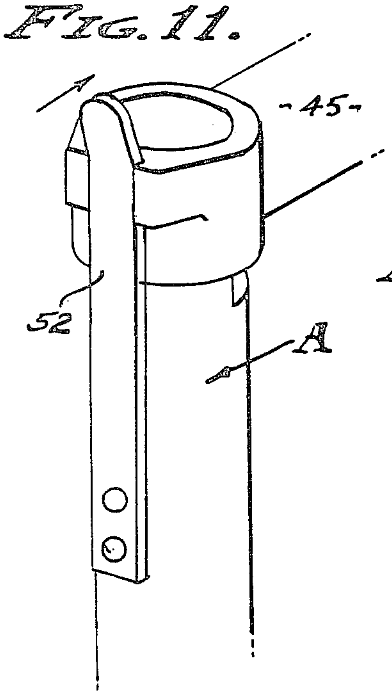
FIG. 11 is a perspective view of the control handle release of the lever means A.
Figure 12:
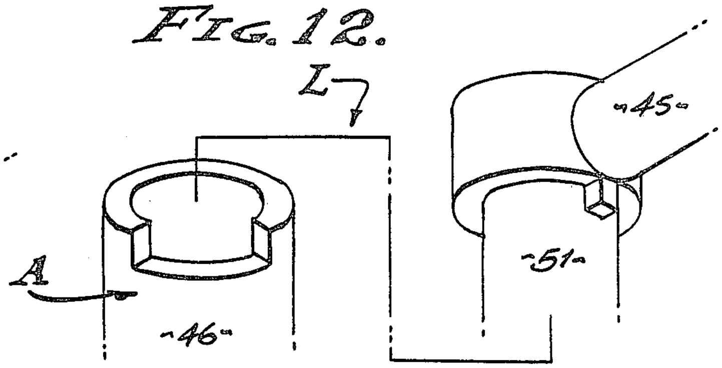
FIG. 12 is an exploded perspective view of the control handle of the lever means A showing its limit of rotation.
Figure 13:
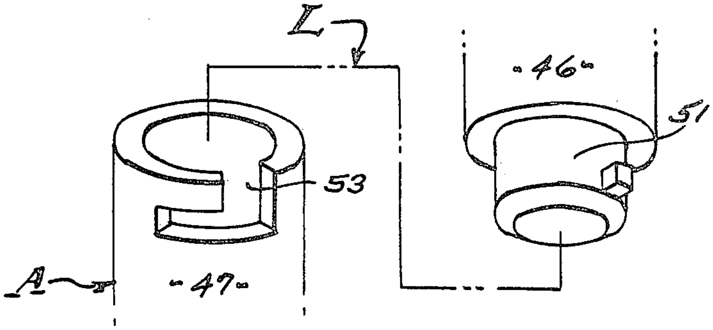
FIG. 13 is an exploded perspective view of the hub of the lever means A showing its means of separation.

The first or second class condition of the lever means A is determined by a manually operable lock means L comprised of the handle 45 carried at the force applied end of arm member 46, and that revolves from a retracted position as shown in FIG. 1 through 90° to a projected position as shown in FIGS. 2–5 (also FIG. 9). Lock means L includes a bolt 51 extending from the handle 45 and through the member 46 to couple with the member 47, and also includes a release means 52. As shown in FIG. 12, the handle 45 is restricted to 90° rotation between said extreme position by a lug operable within a notch, being held in the projected position by a manually releasable spring lock as shown in FIG. 11. As shown in FIG. 13, the bolt 51 has a lug that projects from member 46 and into member 47 to enter a J-slot 53 therein for coupled engagement of the two arm members. Accordingly, the two arm members 46 and 47 can operate as one first class lever and arm member 46 alone can operate alternately as a second class lever, all as circumstances require.

The arm member 47 of lever means A carries a pressure exerting means coupled to the arm 36 of the anchor means B through a link 54. The pressure exerted by said means is compressive and so as to depress the arm 36 in its extended position as shown in FIGS. 2–5, and is shown in FIG. 9 comprised of a piston 55 biased by a spring 56 to limitedly extend a rod 57 connected by link 54 to arm 36. In practice, a stop 58 limits upward revolvement at an over-center position where the arm member 47 is held as shown in FIGS. 2–5. However, a cam-detent 59 compresses the spring 56 as shown in FIG. 1 while the link 54 retracts the arm 36 as shown. In practice therefore, the arm 36 is extended and/or retracted by lever means A in its "first class lever" condition, and alternately the lock means L is released so as to separate the arm members 46 and 47 whereby the arm member 46 is free to be operated by the track T as a "second class lever" as next described.

The drive sprocket 50 is engaged by the chain 33 to turn the sprocket 32 and has drive pins 60 and 61 engageable with arm member 46, providing lost motion therebetween to permit the first class lever operation as above described to depress the anchor means arm 36. However, upon release of lock means L separating arm members 46 and 47, the drive sprocket 50 is driven by pin 60 to operate the lift means C as described. Alternately, the sprocket 50 is driven by pins 61 to retract the anchor means B when recoupled as described.

The follower 13 is rotatably and extensibly carried by the handle 45 as best illustrated in FIG. 9 wherein a compression spring 63 yieldingly retracts a spindle 64 that rotatably carries the follower 13 so that it will turn free in the track T as shown throughout the drawing and as it is detailed in FIG. 6. A safety feature is the track T of dovetail configuration having well rounded inside and outside corners. In practice, the uppermost corner is shallow and obtuse as compared with the lowermost corner that is deep and sharp to guide and retain the roller follower 13 to the track T. The follower 13 presents a complementary knob form or configuration devoid of any sharpness that might otherwise catch garments or cause damage and/or injury.

Figure 14:
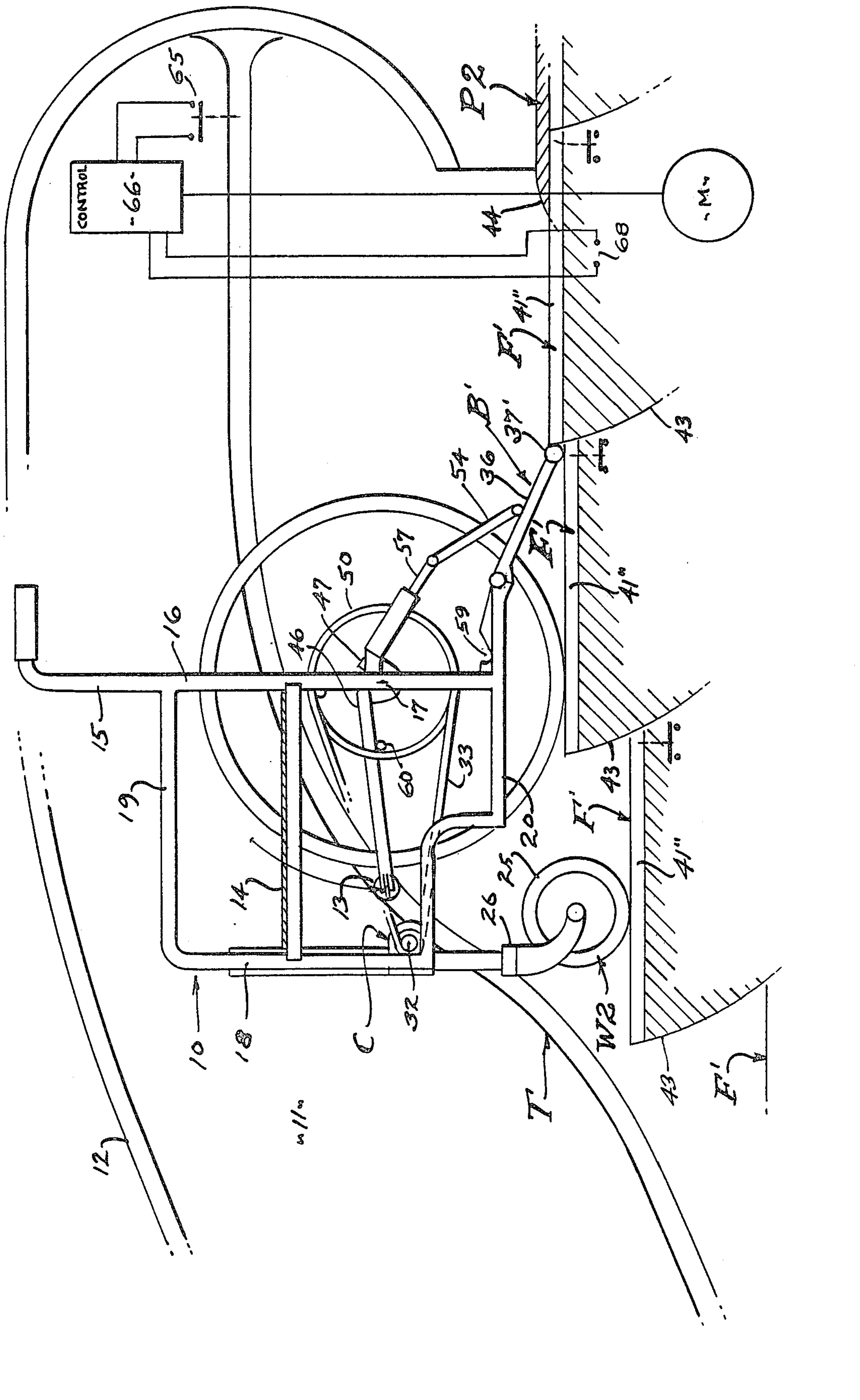
FIG. 14 is a view similar to FIG. 4 showing a basic anchor means that cooperates with a track follower to capture the wheel chair in position on the escalator flights.
Figure 15:
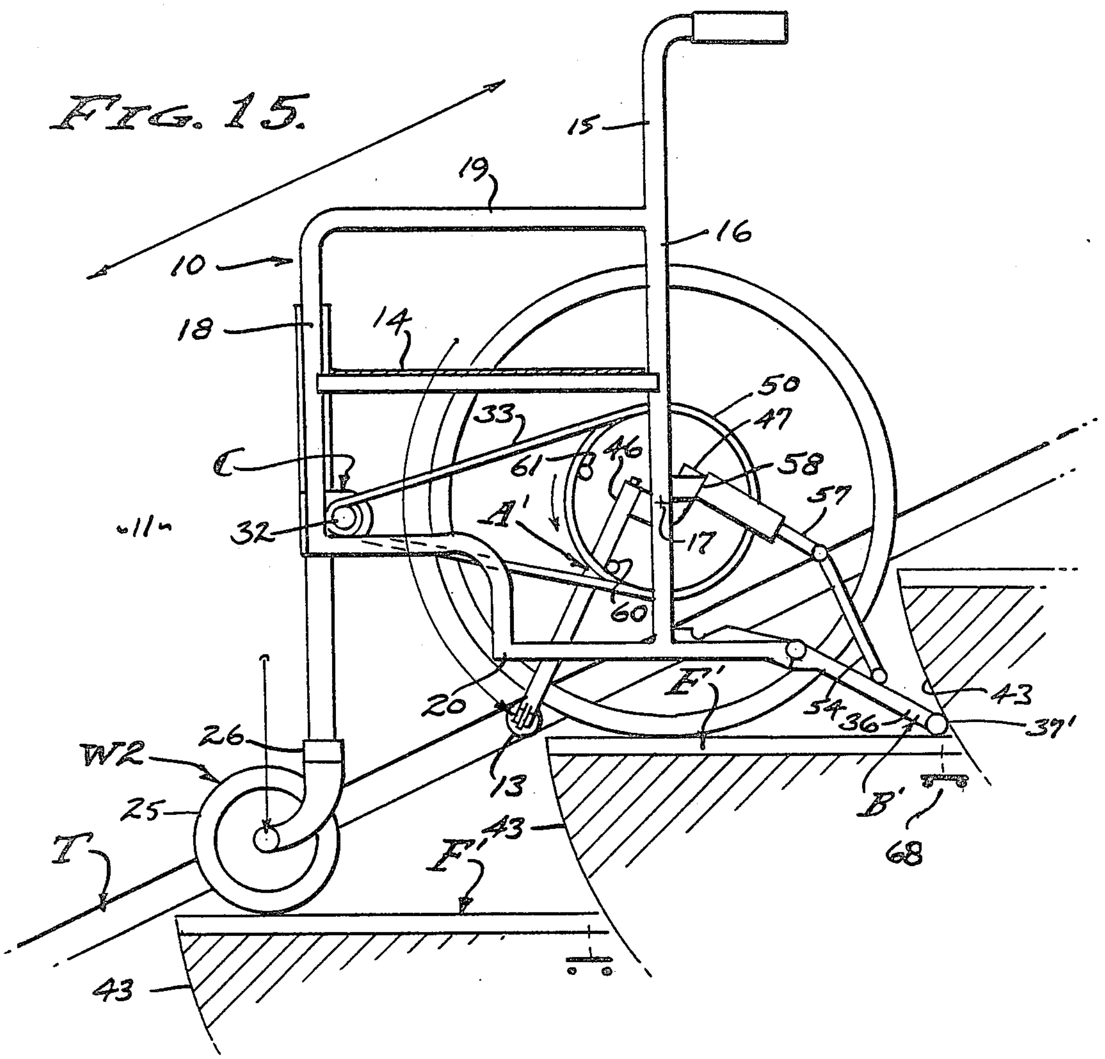
FIG. 15 is a view similar to FIG. 3 showing the anchor configuration of FIG. 14.
Figure 16:
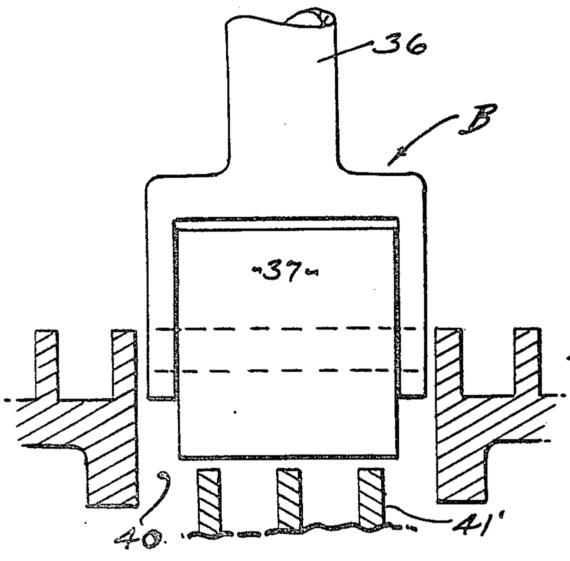
FIGS. 16 and 17 are enlarged detailed views of the anchor configurations, FIG. 16 being that of the first form shown in FIGS. 1-13, FIG. 17 being that of the second basic form shown in FIGS. 14, 15 and 18.
Figure 17:
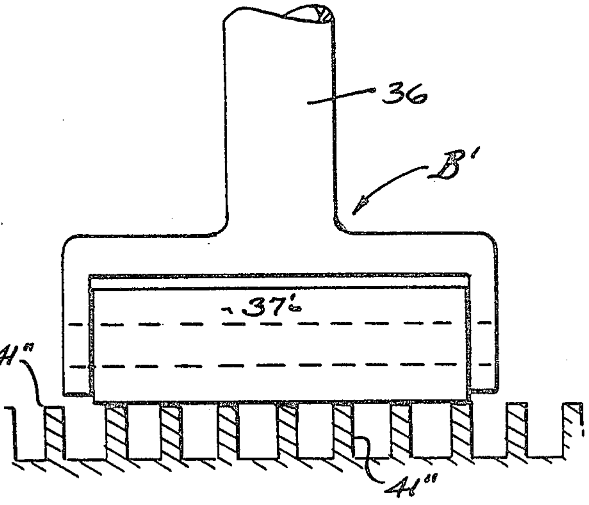
Figure 18:
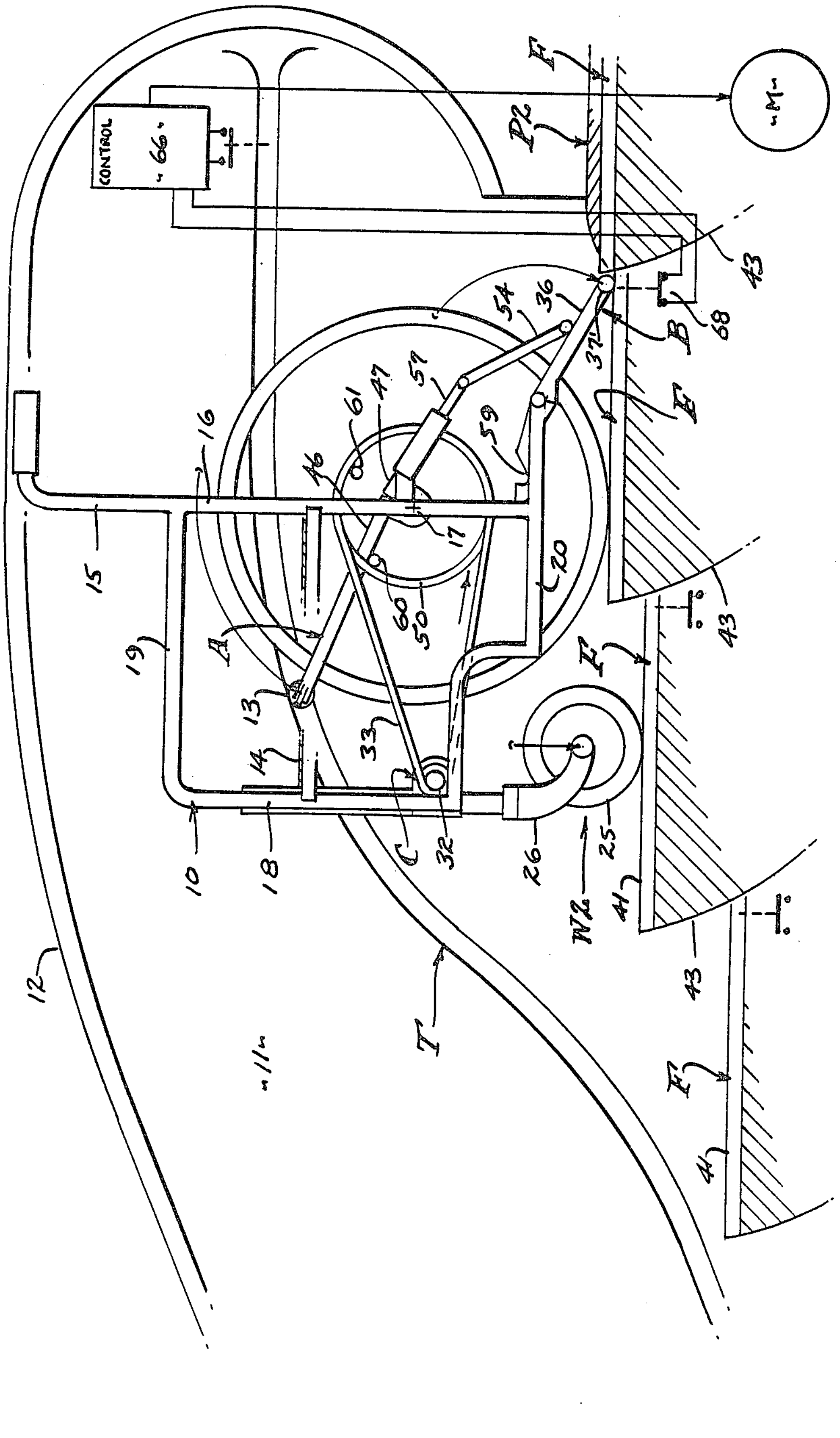
FIG. 18 is a view similar to FIGS. 4 and 14 showing the basic anchor means and preferred escalator flight and control relationships preparatory to descending.
Figure 19:
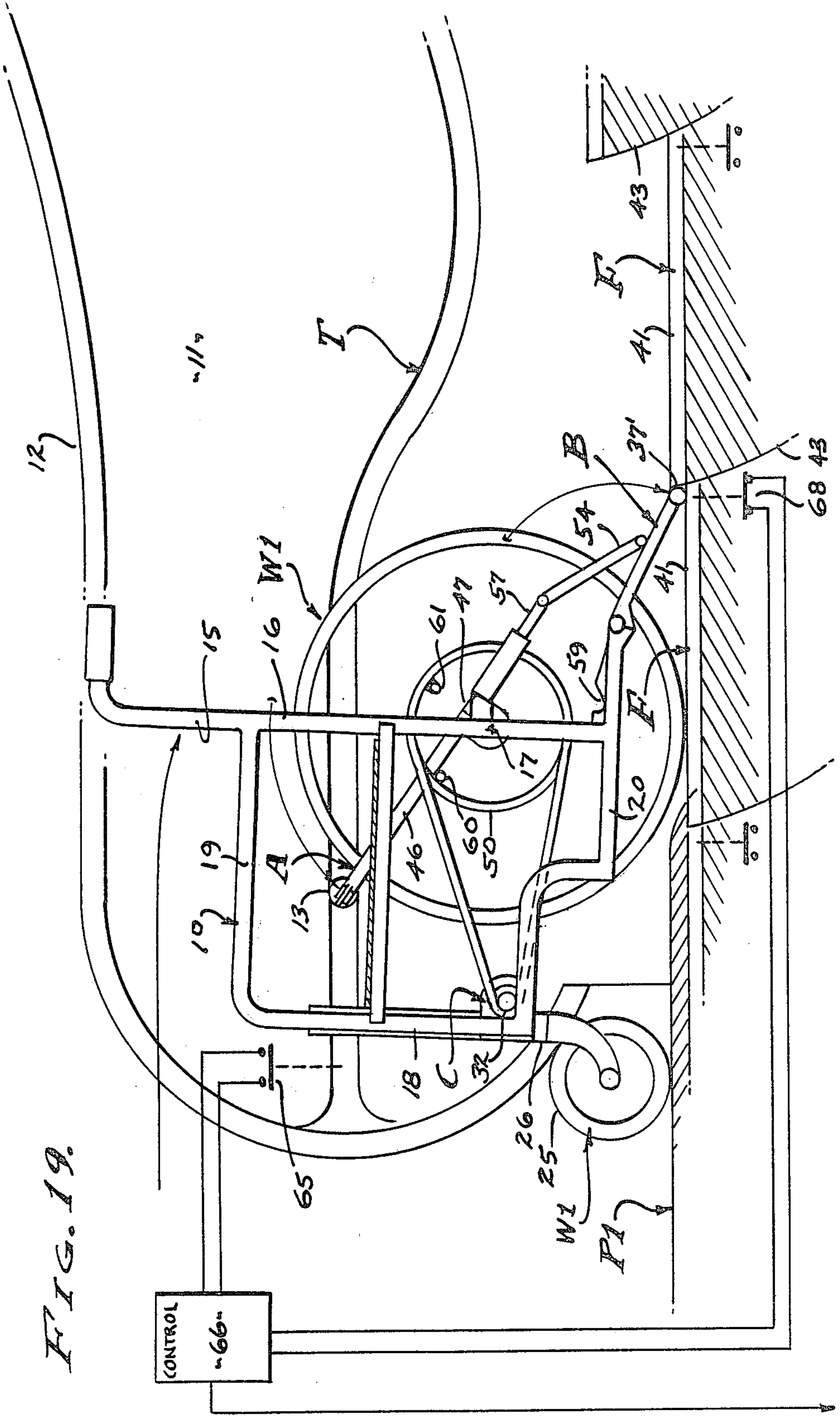
FIG. 19 is a similar view preparatory to ascending.
Figure 20:
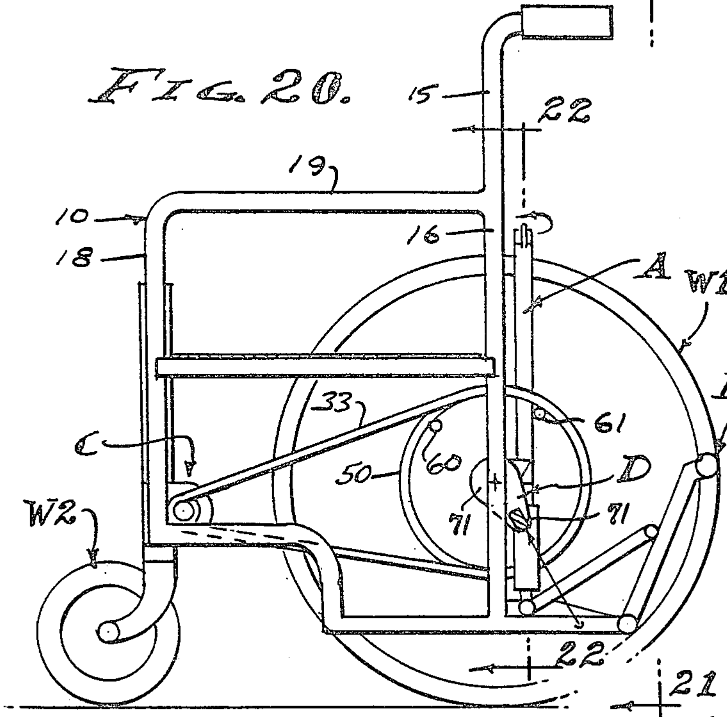
FIG. 20 is a view similar to FIG. 1, incorporating therein a transfer motion between the collapsible side frames and mechanisms involved herein.

Referring now to a more basic form of anchor means B' as it is disclosed in FIGS. 14, 15, 17 and 18 of the drawings, estensibility thereof is by means of the lever means A the same as hereinabove described. However in this form, anchorage is by means of cooperation with the follower 13 operable in the track T all as hereinabove described, but devoid of the flight pockets 40. From FIGS. 14, 15, 17, 18 and 19 it will be observed that the roller 37' is lowered and extended by arm 36 to rest upon the flight ribs or fins 41" and against the adjacent flight riser 43. The roller 37' is of small diameter and the fins 41" are not deepend or as widely spaced as they are in the first form (see FIG. 16). Capture of the wheel chair in riding position on the flights F is by means of the acute angularity between the supporting plane of the flight F and riser 43 simultaneously engageable therewith when the adjacent flight raises with respect to the wheel supporting flight (wheel W1), and by virtue of the converging angular relationship of the track T with respect to the horizontal plane of the wheel supporting flight F (wheels W1 and W2). FIGS. 14, 15 and 18 illustrate this angular convergence of the track T and follower 13 relationship to the acute engagement of roller 37', whereby the wheel chair is captured in riding position on the two vertically displaced flights F.

The basic anchor roller of FIGS. 14, 15, 17, 18 and 19 is inherently forced against a riser 43 as shown, for both UP and DOWN transport of the wheel chair. The convergence of track T and the supporting planes of the flights F makes this a positive function that maintains a proper riding position with the wheel supports W1 and W2 safely positioned upon their respective flights F. Accordingly and as best illustrated in the descent modes of FIGS. 14 and 18, this first fully exposed flight F emanating from the top platform P2 is lowered with respect to the following flight F so that the riser 43 of the latter is exposed to engage with the anchor roller 37'. In practice, the planar offset of the first fully exposed flight F from the emanating flight F is substantially one roller diameter as shown, whereby a positive depression is realized by the riding occupant when the roller 37' is depressed by spring 56 into the acute corner established by said riser 43. It is this roller depression onto the first fully exposed flight F that operates the switch 68.

Concurrently with the foregoing engagement of the anchor roller 37' with the first fully exposed flight F, the roller 13 has moved forwardly in the downwardly curved track T as shown in FIG. 18, whereby the lift means C depresses the wheel support W2 onto its supporting flight. The offset of the two supporting flights F is severe in FIG. 14 and moderate in the chair reception position thereof as shown in FIG. 14, the supporting plane for wheel support W2 being well below the supporting plane of wheel support W1 in FIG. 14, and a roller 37' diameter or less in FIG. 18. Subsequently, the flights are more rapidly offset into the down condition of FIG. 15 for example, according to conventional escalator operation.

The wheel chair herein remains collapsible and so that the laterally separable side frames 10 can be moved together and apart. As thus far described, the controlling means A, B and C and related parts are incorporated individually in each side frame 10 so as to be independently operable. However, it may be desired that the two sides of the wheel chair operate in unison, dependently or independently as may be required. Accordingly, collapsible motion transfer means D is provided as shown in FIGS. 20–23 and which operates between the lever means A at opposite side frames 10.

Figure 22:
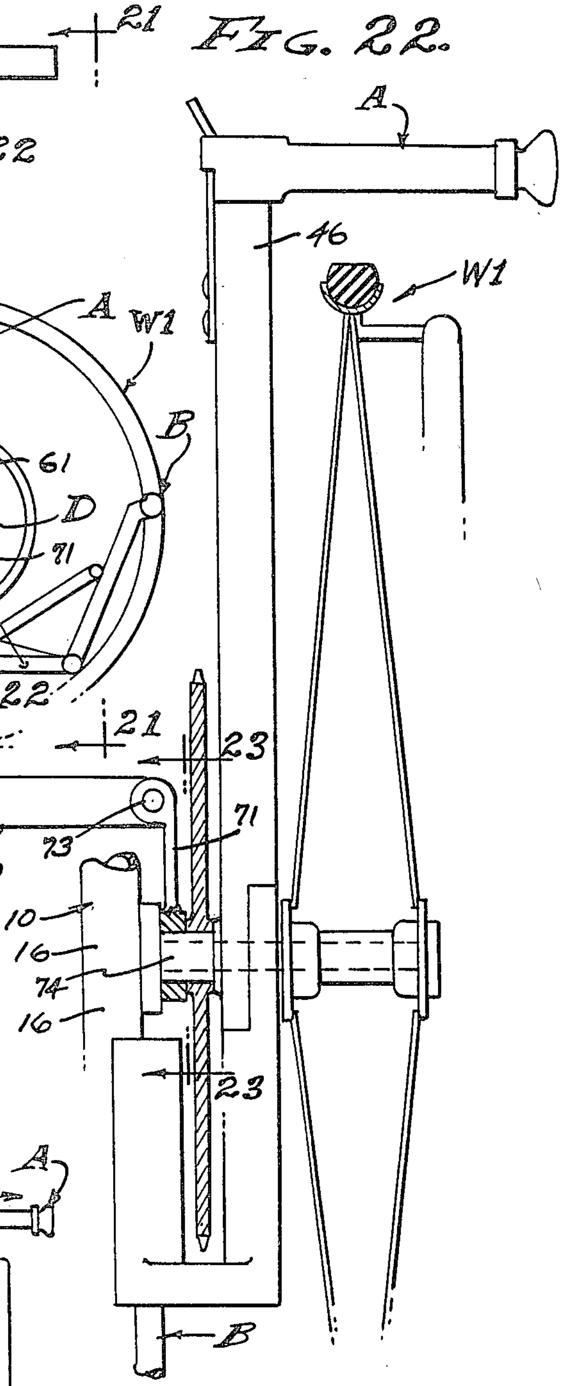
FIG. 22 is an enlarged detailed sectional view similar to FIG. 9 and taken as indicated by line 22—22 on FIG. 20.
Figure 21:
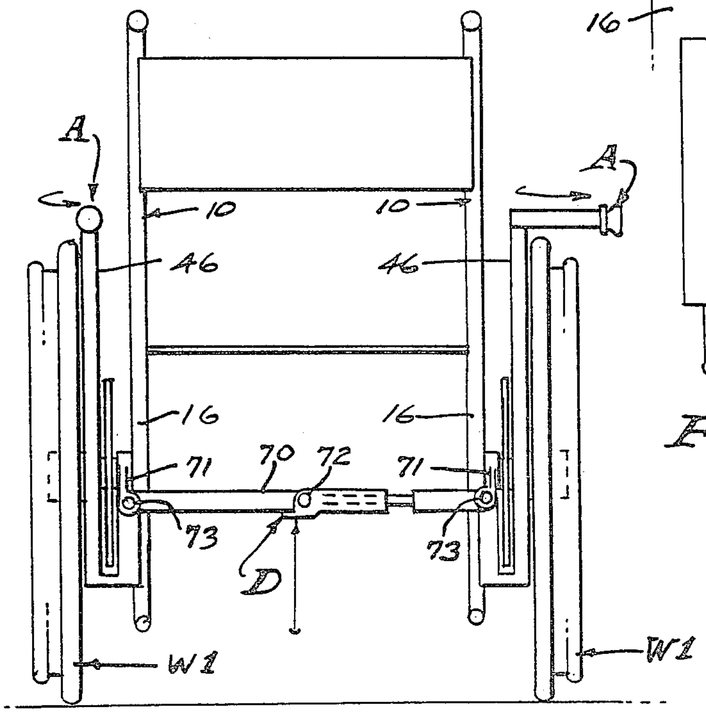
FIG. 21 is a back view of the wheel chair taken as indicated by line 21—21 on FIG. 20.
Figure 23:
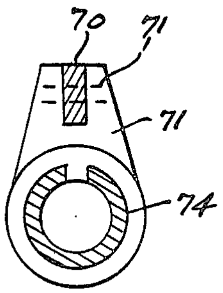
FIG. 23 is an enlarged fragmentary view taken as indicated by line 23—23 on FIG. 22.

The collapsible motion transfer means D involves an articulated torque transmitting bar 70, a sectional bar coupled to transfer levers 71 revolved by each arm member 46 outside of each side frame 10. The bar 70 embraces the spaced legs 16 of opposite side frames 10, from the rear thereof (see FIG. 20). In practice, the rotational limits of arm members 46 is within 180°, so that it may be offset as shown to clear the leg 16; and it is the spaced transfer levers 71 which establishes this offset so that the bar 70 can be broken upwardly and downwardly to the rear and so that it may be straightened (see FIG. 21). The bar 70 breaks at a center pivot 72 on an axis parallel with axes of like pivots 73 at the spaced transfer levers 71. Levers 71 are keyed to sleeves 74 common with arm members 46; and said bar is telescoped as shown in FIG. 22 as to permit flexibility in track width of the wheel chair during its operation.

Operation of the wheel chair and control of the escalator as disclosed herein is as follows: The conventional wheel chair of FIG. 1 incorporates the lever means A which manually holds the anchor means B and lift means C retracted with the handle 45 positioned to lock the arm members 46 and 47 in the first class lever condition ready for operation.

Figure 2:
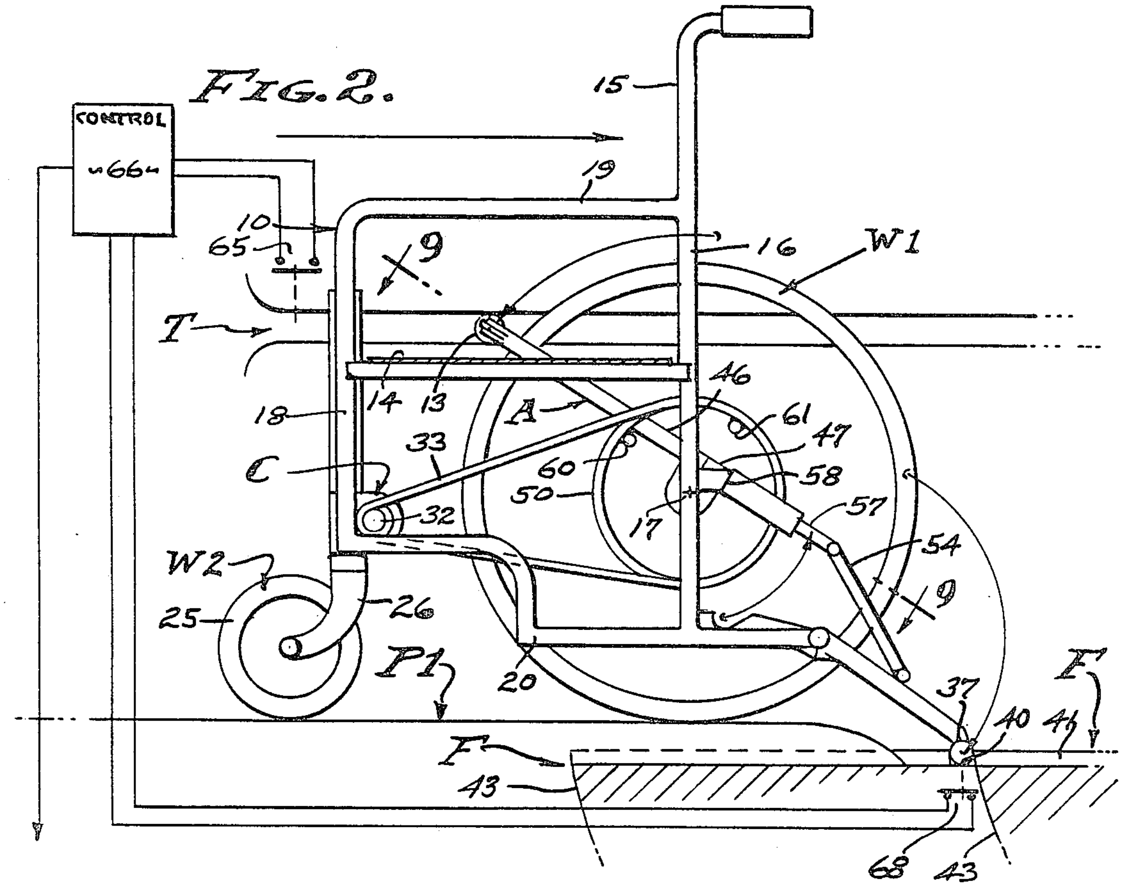
FIG. 2, is a view similar to FIG. 1 showing the wheel chair in combination with and received by the flights of an escalator preliminary to ascent.

Preparatory to ascending, the wheel chair is backed onto the platform P1 of an UP escalator with the lever means A manually operated as shown in FIG. 2 so as to extend and lower the anchor means A and to press the roller 37 (37') onto the supporting surface and onto a flight F. The handle 45 is then rotated (see FIG. 9) to uncouple arm member 46 from arm member 47 and so as to laterally project the follower 13 for its engagement into the track T. Entry of the follower 13 into the track T is by movement of the wheel chair into riding position where there is a gate means represented by a switch 65, the operation of which slows and/or stops the escalator. In practice, the escalator is slowed so that its rate of travel is minimized and accompanied by retraction of the fin sections 41' through control means 66 and retraction means 67 indicated as a solenoid or the like. The control means 66 governs the speed of motor M, and when anchor roller 37 and hook 38 drop into pocket 40 a switch 68 is operated and through control means 66 accelerates and restores motor M to its normal speed so that the escalator resumes its normal rate of ascent. In practice, 65–68 operate sequentially at each side frame anchor means B and are in series or the like, so that simultaneous operation thereof is required in order to restore the motor M to its normal speed. As shown in FIG. 4, there is a second gate means represented by a switch 64 operated by follower 13. Switch 64 is wired into the control means 66 the same as switch 68 and is spaced from switch 65 in the direction of wheel chair movement. Switch 64 can be used as an alternate for or in conjunction with switch 68. Ascent of the wheel chair on vertically spaced flights F is shown in FIG. 3.

Preparatory to descending with the rollers 37 and pockets 40, the wheel chair is advanced forwardly from the platform P2 and onto adjacent coplanar flights F of a DOWN escalator with the lever means A manually operated as shown in FIG. 4 so as to extend and lower the anchor means A and to press the roller 37 onto the supporting surface and onto the rearmost exposed flight F. The handle 45 is then rotated (see FIG. 9) to uncouple arm member 46 from arm member 47 and so as to project the follower 13 for its engagement into the track T. Initial entry of the follower 13 into the track T is by movement of the wheel chair toward riding position where there is a gate means represented by a switch 65, the operation of which slows and/or stops the escalator. In practice, the escalator is slowed so that its rate of travel is minimized and accompanied by retraction of the fin sections 41' through the control means 66 when a gate switch 65 is operated for the actuation of the retraction means 67. The control means 66 governs the speed of motor M, and when the anchor roller 37 and hook 38 drop into the opened pocket 40 a switch 68 is operated and through control means 66 accelerates and restores motor M to its normal speed so that the escalator resumes its normal rate of descent. Descent of the wheel chair on vertically spaced flights F is shown in FIG. 3.

Preparatory to descending with the rollers 37' and without pockets 40, the wheel chair is advanced forwardly through the gate switch or switches 65 and from the platform P2 and onto a flight F substantially coplanar therewith and with the lever means A manually operated as shown in FIG. 14 so as to extend and lower the anchor means A and to press the roller rollers 37' onto the rearmost exposed flight F. As is shown, when the gate switch 65 is operated the escalator is stopped so as to enable the occupant to place the wheel chair into proper riding position with the anchor rollers 37' engaging a riser 43, whereby actuation of switches 68 through control means 66 restores motor M to its normal speed and so that the escalator resumes its normal rate of descent.

Preparatory to descending with the rollers 37' and without gate switches 65, the wheel chair is advanced forwardly through the gate switch or switches 65 and from the platform P2 and onto a fully exposed flight F offset substantially one roller diameter below the next emanating flight F, and with the lever means A manually operated as shown in FIG. 18 so as to extend and lower the anchor means A and to press the roller 37' onto the supporting surface and onto the rearmost exposed flight F. As is shown, when the gate switch 65 is operated the escalator is slowed and/or stopped or pauses in the position shown, with the adjacent flight F beneath the front wheel support W2 offset moderately and preferably about one roller 37' diameter below the flight F beneath the main wheel support W1. This delay in transport of the escalator enables the occupant to place the wheel chair into proper riding position with the anchor rollers 37' engaging a riser 43, whereby actuation of switches 68 through control means 66 restores motor M to its normal speed and so that the escalator resumes its normal rate of descent.

Operation of the wheel chair and of the escalator is the same with both forms of anchor means A and A', and it is to be understood that the means A, B, and C as they are disclosed herein are applied to at least one and preferably to both the left and right side frames of the wheel chair and to both the left and right rails of the escalator, and independently operable as described and as circumstances require.

Having described only the typical preferred forms and applications of my invention, I do not wish to be limited or restricted to the specific details herein set forth, but wish to reserve to myself any modifications or variations that may appear to those skilled in the art as set forth within the limits of the following claims.

I claim:

1. The combination of an escalator and a wheel chair, and including;

the escalator having side walls spaced to closely pass spaced side frames of the wheel chair, an endless belt of flights extending between vertically spaced floor levels to move within the confines of the spaced side walls, and having lower and upper platforms at said spaced floor levels and means to maintain a horizontal disposition of the flights as they are vertically offset by means to form steps as the belt thereof is propelled by motor means, the wheel chair having a main wheel support rotatable outside of each side frame and on a common axis aft of the center of gravity when a person is seated in the wheel chair, and a downwardly extensible wheel support at the front of each side frame and on independent lift axes well forward of said center of gravity, a track extending between the lower and upper platforms, said track having variable displacement with respect to the vertical disposition of the flights, and the wheel chair having control means engageable with the track to extend the wheel supports at the front of each side frame in response to the variable displacement of the track from the flights to depress said front wheel supports and controllably maintain the horizontal disposition of the wheel chair.

2. The combination of an escalator and a wheel chair as set forth in claim 1, wherein the wheel chair control means is comprised of a lever having a follower engageable with the track and operably connected to lift means to depress the front wheel supports.

3. The combination of an escalator and a wheel chair as set forth in claim 1, wherein the wheel chair control means is comprised of a lever having a laterally extensible follower engageable with the track and operably connected to lift means to depress the front wheel supports.

4. The combination of an escalator and a wheel chair as set forth in claim 1, wherein the wheel chair control means is comprised of a lever having a yieldingly retracted laterally extensible follower engageable with the track and operably connected to lift means to depress the front wheel supports.

5. The combination of an escalator and a wheel chair as set forth in claim 1, wherein the wheel chair control means is comprised of a lever having a manually shiftable follower retractably projecting laterally to engage with the track and operably connected to lift means to depress the front wheel supports.

6. The combination of an escalator and a wheel chair as set forth in claim 1, wherein the wheel chair control means is comprised of a lever having a manually shiftable follower projecting and yieldingly retracted laterally from engagement with the track and operably connected to lift means to depress the front wheel supports.

7. The combination of an escalator and a wheel chair as set forth in claim 1, wherein the escalator track and wheel chair control means are independently operable at each side wall and closely related side frames of the wheel chair.

8. The combination of an escalator and a wheel chair as set forth in any one of claims 1 through 7, wherein the main wheel support is rotatable on axles projecting outwardly from each side frame on said common axis, and wherein the control means is carried on said axles between the side frames and main wheel supports at each side of the wheel chair.

9. The combination of an escalator and a wheel chair, and including;

the escalator having side walls spaced to closely pass spaced side frames of the wheel chair, an endless belt of flights extending between vertically spaced floor levels to move within the confines of the spaced side walls, and having lower and upper platforms at said spaced floor levels and means to maintain a horizontal disposition of the flights as they are vertically offset by means to form steps as they are propelled by motor means, the wheel chair having a main wheel support rotatable outside of each side frame and on a common axis aft of the center of gravity when a person is seated in the wheel chair, and a downwardly extensible wheel support at the front of each side frame and on independent lift axes well forward of said center of gravity, a track extending between the lower and upper platforms, said track having variable displacement with respect to the vertical disposition of the flights, and the wheel chair having a flight engageable anchor means extensible from at least one of the side frames, and a manually operable control means to extend the anchor means into flight engagement and thereafter engageable with the track and operable to extend the wheel supports at the front of each side frame in response to the variable displacement of the track from the flights to depress said front wheel supports.

10. The combination of an escalator and a wheel chair as set forth in claim 9, wherein the manually operable control means is comprised of a lever having releasibly coupled arm members operable when coupled to extend the anchor means into flight engagement and operable when uncoupled to depress the front wheel supports.

11. The combination of an escalator and a wheel chair as set forth in claim 9, wherein the manually operable control means is comprised of a lost motion lift means to depress and retract the front wheel supports and a lever having releasably coupled arm members operable through the lost motion of the lift means when coupled to extend the anchor means into flight engagement and operable at the end of said lost motion when uncoupled to depress the front wheel support and be reversely moved thereby.

12. The combination of an escalator and a wheel chair as set forth in claim 9, wherein the manually operable control means is comprised of a lift means having a lost motion sprocket and chain drive to depress and retract the front wheel supports and a lever having releasably coupled arm members operable between drive pins of said lost motion lift means when coupled to extend the anchor means into flight engagement, and operable against a drive pin at the end of said lost motion when uncoupled to depress the front wheel support and be reversely moved thereby.

13. The combination of an escalator and a wheel chair as set forth in claim 9, wherein the manually operable control means is comprised of a rack and pinion lift means having a lost motion sprocket and chain drive to depress and retract the front wheel supports and a lever having releasably coupled arm members operable between drive pins of said lost motion lift means when coupled to extend the anchor means into flight engagement, and operable against a drive pin at the end of said lost motion when uncoupled to operate the rack and pinion lift means and depress the front wheel support and be reversely moved thereby.

14. The combination of an escalator and a wheel chair as set forth in any one of claims 10 through 13, wherein the lever is releasably coupled by a manually shiftable handle to project laterally and having a follower yieldingly retracted from engagement with the track.

15. The combination of an escalator and a wheel chair as set forth in claim 9, wherein the manually operable control means is comprised of an arm swinging from the rear of each side frame and engageable at a supporting surface and riser of adjacent flights.

16. The combination of an escalator and a wheel chair as set forth in claim 9, wherein the manually operable control means is comprised of an arm swinging from the rear of each side frame and includes spring means to depress the arm into said flight engagement at a supporting surface and riser of adjacent flights.

17. The combination of an escalator and a wheel chair as set forth in claim 9, wherein the manually operable control means is comprised of an arm swinging from the rear of each side frame and each with a roller engageable at a supporting surface and riser of adjacent flights.

18. The combination of an escalator and a wheel chair as set forth in claim 9, wherein the manually operable control means is comprised of an arm swinging from the rear of each side frame and each with a roller engageable at an acute corner defined by the supporting surface and riser of adjacent flights.

19. The combination of an escalator and a wheel chair as set forth in claim 9, wherein the manually operable control means is comprised of an arm swinging from the rear of each side frame and each with a roller engageable into a pocket and captured at an acute corner defined by the supporting surface and riser of adjacent flights.

20. The combination of an escalator and a wheel chair as set forth in any one of claims 9 through 13 and 15 through 19, wherein the main wheel support is rotatable on axles projecting outwardly from each side frame on said common axis, and wherein the manually operable control means is carried on said axles between the side frames and main wheel supports at each side of the wheel chair.

21. The combination of an escalator and a wheel chair as set forth in claim 9, wherein the track has openings to be exposed at the lower and upper platforms for the reception of and discharge of a follower operating the manually operable control means.

22. The combination of an escalator and a wheel chair as set forth in claim 9, wherein the track has openings to be exposed at the lower and upper platforms for the reception of and discharge of a follower operating the manually operable control means, and wherein a gate means at one of said track openings is actuated by engagement of the follower in the track to control the speed of the motor means.

23. The combination of an escalator and a wheel chair as set forth in claim 9, wherein a first gate means is actuated by engagement of a follower in the track operating motor control means to slow the speed of the motor means, and wherein a second gate means spaced in the direction of transport is actuated by engagement of the follower in the track operating said motor means to restore the operating speed thereof.

24. The combination of an escalator and a wheel chair as set forth in claim 9, wherein the track has openings to be exposed at the lower and upper platforms for the reception of and discharge of a follower operating the manually operable control means, wherein a first gate means at one of said track openings is actuated by engagement of the follower in the track operating motor control means to slow the speed of the motor means, and wherein a second gate means spaced in the direction of transport is actuated by engagement of the follower in the track operating said motor means to restore the operating speed thereof.

25. The combination of an escalator and a wheel chair as set forth in any one of claims 21 through 24, wherein the control means and track and follower are independently cooperable at each side wall of the escalator.

26. The combination of an escalator and a wheel chair as set forth in claim 9, wherein the track is positioned in a side wall to engage a follower projecting from the control means of the wheel chair subsequent to operation of said control means extending the anchor means of the wheel chair, and wherein a gate means is actuated by engagement of the follower in the track to control the speed of the motor means.

27. The combination of an escalator and a wheel chair as set forth in claim 9, wherein the track is positioned in a side wall to engage a follower projecting from the control means of the wheel chair subsequent to operation of said control means extending the anchor means of the wheel chair, and wherein the track has openings to be exposed at the lower and upper platforms for the reception of and discharge of the follower.

28. The combination of an escalator and a wheel chair as set forth in claim 9, wherein the track is positioned in a side wall to engage a follower projecting from the control means of the wheel chair subsequent to operation of said control means extending the anchor means of the wheel chair, wherein the track has openings to be exposed at the lower and upper platforms for the reception of and discharge of the follower, and wherein a gate means at one of said track openings is actuated by engagement of the follower in the track to control the speed of the motor means.

29. The combination of an escalator and a wheel chair as set forth in claim 9, wherein the track is positioned in a side wall to engage a follower projecting from the control means of the wheel chair subsequent to operation of said control means extending the anchor means of the wheel chair, wherein a first gate means is actuated by engagement of the follower in the track operating motor control means to slow the speed of the motor means, and wherein a second gate means spaced in the direction of transport is actuated by engagement of the follower in the track operating said motor means to restore the operating speed thereof.

30. The combination of an escalator and a wheel chair as set forth in claim 9, wherein the track is positioned in a side wall to engage a follower projecting from the control means of the wheel chair subsequent to operation of said control means extending the anchor means of the wheel chair, wherein the track has openings to be exposed at the lower and upper platforms for the reception of and discharge of the follower, wherein a first gate means at one of said track openings is actuated by engagement of the follower in the track operating motor control means to slow the speed of the motor means, and wherein a second gate means spaced in the direction of transport is actuated by engagement of the follower in the track operating said motor means to restore the operating speed thereof.

31. The combination of an escalator and a wheel chair as set forth in any one of claims 26 through 30, wherein the control means and anchor means and track and follower are independently cooperable at each side wall of the escalator.

32. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, and wherein platform fingers project between said ribs and are pointed with an inclined plane extending from the bottom of the pockets intercepted thereby to lift the anchor means roller.

33. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, wherein the track is positioned is a side wall to engage the follower projecting from the control means of the wheel chair subsequent to operation of said control means extending the anchor means of the wheel chair, and wherein a gate means in the track is actuated by a follower projecting from the control means and engageable in the track to slow the speed of the motor means to enable depression of the anchor roller means into the pocket.

34. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, wherein a safety switch means is exposed in said pocket to be actuated by the anchor roller means when received therein, wherein the track is positioned in a side wall to engage the follower projecting from the control means of the wheel chair subsequent to operation of said control means extending the anchor roller means of the wheel chair, and wherein a gate means in the track is actuated by a follower projecting from the control means and engageable in the track to slow the speed of the motor means to enable depression of the anchor follower means into the pocket and for actuation of the safety switch means operable through motor control means to restore the motor means to speed.

35. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, wherein the track is positioned in a side wall to engage a follower projecting from the control means of the wheel chair subsequent to operation of said control means extending the anchor roller means of the wheel chair, wherein a first gate means in the track is actuated by engagement of the follower in the track operating motor control means to slow the speed of the motor means and enable depression of the anchor roller means into the pocket, wherein a safety switch means is exposed in said pocket to be actuated by the anchor roller means when received therein, and wherein a second gate means in the track and spaced in the direction of transport is actuated by engagement of the follower in the track and together with said safety switch means and through said motor control means operating to restore the operating speed thereof.

36. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, and wherein retractable ribs are withdrawn by means responsive to actuation of a gate means to form said pcoket.

37. The combination of an escalator and a wheel chair as set forth in claim 9, wherein each flight has a riser and a supporting surface comprised of longitudinally disposed upstanding ribs and a pocket adapted to receive an anchor means roller and formed therein at the riser of the next adjacent flight, and wherein the control means and anchor roller means and track and a follower and gate means are independently cooperable at each side wall of the escalator.

38. A multi-purpose wheel chair for normal use and for transport upon variably offset flights of an escalator having spaced side walls and a track variably displaced from the flights to control the horizontal disposition of the wheel chair, and including;

spaced side frames to pass closely within the confines of the spaced side walls of the escalator, a main wheel support rotatable outside of each side frame and on a common axis aft of the center of gravity when a person is seated in the wheel chair, a downwardly extensible wheel support at the front of each side frame and on independent lift axes well forward of said center of gravity, and control means engageable with the track to extend the wheel supports at the front of each side frame in response to the variable displacement of the track from the flights to depress said front wheel supports and controllably maintain the horizontal disposition of the wheel chair.

39. The multi-purpose wheel chair as set forth in claim 38, wherein the control means is comprised of a lever having a follower engageable with the track and operably connected to lift means to depress the front wheel supports.

40. The multi-purpose wheel chair as set forth in claim 38, wherein the control means is comprised of a lever having a laterally extensible follower engageable with the track and operably connected to lift means to depress the front wheel supports.

41. The multi-purpose wheel chair as set forth in claim 38, wherein the control means is comprised of a lever having a yieldingly retracted laterally extensible follower engageable with the track and operably connected to lift means to depress the front wheel supports.

42. The multi-purpose wheel chair as set forth in claim 38, wherein the control means is comprised of a lever having a manually shiftable follower retractably projecting laterally to engage with the track and operably connected to lift means to depress the front wheel supports.

43. The multi-purpose wheel chair as set forth in claim 38, wherein the control means is comprised of a lever having a manually shiftable follower projecting and yieldingly retracted laterally from engagement with the track and operably connected to lift means to depress the front wheel supports.

44. The multi-purpose wheel chair as set forth in claim 38, wherein the control means is independently operable in each of the side frames and with a follower engageable with a track at each side wall of the escalator.

45. The multi-purpose wheel chair as set forth in any one of claims 38 through 44, wherein the main wheel support is rotatable on axles projecting outwardly from each side rame on said common axis, and wherein the control means is carried on said axles between the side frames and main wheel supports at each side of the wheel chair.

46. A multi-purpose wheel chair for normal use and for transport upon variably offset flights of an escalator having spaced side walls and a track variably displaced from the flights to control the horizontal disposition of the wheel chair, and including;

spaced side frames to pass closely within the confines of the spaced side walls of the escalator, a main wheel support rotatable outside of each side frame and on a common axis aft of the center of gravity when a person is seated in the wheel chair, a downwardly extensible wheel support at the front of each side frame and on independent lift axes well forward of said center of gravity, a flight engageable anchor means extensible from at least one of the side frames, and manually operable control means to extend the anchor means into flight engagement and thereafter engageable with the track and operable to extend the wheel supports at the front of each side frame in response to the variable displacement of the track from the flights to depress said front wheel supports.

47. The multi-purpose wheel chair as set forth in claim 46, wherein the control means is comprised of a lever having releasibly coupled arm members operable when coupled to extend the anchor means into flight engagement and operable when uncoupled to depress the front wheel supports.

48. The multi-upurpose wheel chair as set forth in claim 46, wherein the control means is comprised of a lost motion lift means to depress and retract the front wheel supports and a lever having releasably coupled arm members operable through the lost motion of the lift means when coupled to extend the anchor means into flight engagement and operable at the end of said lost motion when uncoupled to depress the front wheel support and be reversely moved thereby.

49. The multi-purpose wheel chair as set forth in claim 46, wherein the control means is comprised of a lift means having a lost motion sprocket and chain drive to depress and retract the front wheel supports and a lever having releasably coupled arm members operable between drive pins of said lost motion lift means when coupled to extend the anchor means into flight engagement, and operable against a drive pin at the end of said lost motion when uncoupled to depress the front wheel support and be reversely moved thereby.

50. The multi-purpose wheel chair as set forth in claim 46, wherein the control means is comprised of a rack and pinion lift means having a lost motion sprocket and chain drive to depress and retract the front wheel supports and a lever having releasably coupled arm members operable between drive pins of said lost motion lift means when coupled to extend the anchor means into flight engagement, and operable against a drive pin at the end of said lost motion when uncoupled to operate the rack and pinion lift means and depress the front wheel support and be reversely moved thereby.

51. The multi-purpose wheel chair as set forth in any one of claims 47, 48, 49 or 50, wherein the lever is releasably coupled by a manually shiftable handle to project laterally and having a follower yieldingly retracted from engagement with the track.

52. The multi-purpose wheel chair as set forth in claim 46, wherein the flight engaged anchor means is comprised of an arm swinging from the rear of each side frame and engageable at a supporting surface and riser of adjacent flights.

53. The multi-purpose wheel chair as set forth in claim 46, wherein the flight engaged anchor means is comprised of an arm swinging from the rear of each side frame and includes spring means to depress the arm into said flight engagement at a supporting surface and riser of adjacent flights.

54. The multi-purpose wheel chair as set forth in claim 46, wherein the flight engaged anchor means is comprised of an arm swinging from the rear of each side frame and each with a roller engageable at a supporting surface and riser of adjacent flights.

55. The multi-purpose wheel chair as set forth in claim 46, wherein the flight engageable anchor means is comprised of an arm swinging from the rear of each side frame and each with a roller engageable at an acute corner defined by the supporting surface and riser of adjacent flights.

56. The multi-purpose wheel chair as set forth in claim 46, wherein the flight engageable anchor means is comprised of an arm swinging from the rear of each side frame and each with a roller engageable into a pocket and captured at an acute corner defined by the supporting surface and riser of adjacent flights.

57. The multi-purpose wheel chair as set forth in any one of claims 46 through 50, 52 through 56, wherein the main wheel support is rotatable on axles projecting outwardly from each side frame on said common axis, and wherein the manually operable control means is carried on said axles between the side frames and main wheel supports at each side of the wheel chair.

58. A multi-purpose collapsible wheel chair for normal use and for transport upon variably offset flights of an escalator having spaced side walls and a track variably displaced from the flights to control the horizontal disposition of the wheel chair, and including;

spaced side frames to pass closely within the confines of the spaced side walls of the escalator, a main wheel support rotatable outside of each side frame and on a common axis aft of the center of gravity when a person is seated in the wheel chair, a downwardly extensible wheel support at the front of each side frame and on independent lift axes well forward of said center of gravity, control means disposed between each side frame and main wheel support and at least one of said control means being engageable with the track to extend the wheel supports at the front of each side frame in response to the variable displacement of the track from the flights to depress said front wheel supports and controllably maintain the horizontal disposition of the wheel chair, and a collapsible motion transfer means coupling the control means at opposite side frames to operate one from the other.

59. The multi-purpose collapsible wheel chair as set forth in claim 58, wherein at least one of the control means at opposite side frames is comprised of a lever having a follower engageable with the track and operably connected to lift means to depress the front wheel support.

60. The multi-purpose collapsible wheel chair as set forth in claim 58, wherein at least one of the control means at opposite side frames is comprised of a lever having a follower engageable with the track and operably connected to lift means to depress the front wheel support, and wherein the collapsible motion transfer means is comprised of a sectional bar articulated to break at its center and coupled to each lever.

61. The multi-purpose collapsible wheel chair as set forth in claim 58, wherein at least one of the control means at opposite side frames is comprised of a lever having a follower engageable with the track and operably connected to lift means to depress the front wheel support, and wherein the collapsible motion transfer means is comprised of a sectional bar articulated to break at its center and coupled to each lever by a transfer lever on the main wheel support axis and rotating with said control means lever.

62. An escalator for the transport of a wheel chair having spaced side frames with main wheel supports and having control means with a track follower to depress said front wheel supports and thereby maintain the horizontal disposition of the wheel chair during vertical displacement of escalator flights, and including;

side walls spaced to closely pass the side frames of the wheel chair, an endless belt of flights extending between vertically spaced floor levels to move within the confines of the spaced side walls, lower and upper platforms at said spaced floor levels and means to maintain a horizontal disposition of the flights as they are vertically offset by means to form steps as they are propelled by motor means, and a variably displaced track extending between the lower and upper platforms and engaged by the track follower of the said wheel chair control means operable in response to said variable displacement of the track to maintain the horizontal disposition of the wheel chair with the main and front wheel supports carried upon adjacent flights.

63. The escalator for the transport of a wheel chair as set forth in claim 62, wherein the track is in a side wall to engage the track follower projecting from the control means of the wheel chair.

64. The escalator for the transport of a wheel chair as set forth in claim 62, wherein the track is variably displaced from the flights as it extends between the lower and upper platforms.

65. The escalator for the transport of a wheel chair as set forth in claim 62, wherein the track is carried by a side wall and variably displaced above the flights as it extends between the lower and upper platforms.

66. The escalator for the transport of a wheel chair as set forth in claim 62, wherein a gate means is actuated by engagement of the track follower in the track to control the speed of the motor means.

67. The escalator for the transport of a wheel chair as set forth in claim 62, wherein the track has openings to be exposed at the lower and upper platforms for the reception of and discharge of the track follower.

68. The escalator for the transport of a wheel chair as set forth in claim 62, wherein the track has openings to be exposed at the lower and upper platforms for the reception of and discharge of the track follower, and wherein a gate means at one of said track openings is actuated by engagement of the track follower in the track to control the speed of the motor means.

69. The escalator for the transport of a wheel chair as set forth in claim 62, wherein a first gate means is actuted by engagement of the track follower in the track operating motor control means to slow the speed of the motor means, and wherein a second gate means spaced in the direction of transport is actuated by engagement of the track follower in the track operating said motor means to restore the operating speed thereof.

70. The escalator for the transport of a wheel chair as set forth in claim 62, wherein the track has openings to be exposed at the lower and upper platforms for the reception of and discharge of the track follower, wherein a first gate means at one of said track openings is actuated by engagement of the track follower in the track operating motor control means to slow the speed of the motor means, and wherein a second gate means spaced in the direction of transport is actuated by engagement of the track follower in the track operating said motor means to restore the operating speed thereof.

71. The escalator for the transport of a wheel chair as set forth in any one of claims 62 through 70, wherein a variably displaced track is independently cooperable with the track follower of the said wheel chair control means at each side wall of the escalator.

72. An escalator for the transport of a wheel chair having spaced side frames with spaced main and downwardly extensible front wheel supports and downwardly extensible anchor means and having control means with a track follower to depress said anchor means into engagement with escalator flights and to depress said front wheel supports and thereby maintain the horizontal disposition of the wheel chair during vertical displacement of a riser at adjacent escalator flights, and including;

side walls spaced to closely pass the side frame of the wheel chair, an endless belt of flights with risers extending between vertically spaced floor levels to move within the confines of the spaced side walls, lower and upper platforms at said spaced floor levels and means to maintain a horizontal disposition of the flights as they are vertically offset by means to form steps and expose the risers at adjacent flights as they are propelled by motor means from one platform to the other, and a variably displaced track extending between the lower and upper platforms and engaged by the track follower of the said wheel chair control means operable to extend the anchor means of the wheel chair into engagement with a flight and adjacent riser and operable in response to said variable displacement of the track to maintain the horizontal disposition of the wheel chair with the main and front wheel supports carried upon adjacent flights separated vertically by said riser.

73. The escalator for transport of a wheel chair as set forth in claim 72, wherein the track is positioned in a side wall to engage the track follower projecting from the control means of the wheel chair subsequent to operation of said control means extending the anchor means of the wheel chair.

74. The escalator for transport of a wheel chair as set forth in claim 72, wherein the track is positioned to receive the track follower of the control means subsequent to operation thereof extending the anchor means and is variably displaced from the flights as it extends between the lower and upper platforms to govern the wheel chair control means.

75. The escalator for transport of a wheel chair as set forth in claim 72, wherein the track is carried by a side wall and is positioned to receive the track follower of the control means subsequent to operation thereof extending the anchor means and is variably displaced above the flights as it extends between lower and upper platforms to govern the wheel chair control means.

76. The escalator for transport of a wheel chair as set forth in claim 72, wherein the track is positioned in a side wall to engage the track follower projecting from the control means of the wheel chair subsequent to operation of said control means extending the anchor means of the wheel chair, and wherein a gate means is actuated by engagement of the track follower in the track to control the speed of the motor means.

77. The escalator for transport of a wheel chair as set forth in any one of claims 68, 69 or 76, wherein the control means and track follower are independently cooperable with a safety switch means at each side wall of the escalator.

78. The escalator for transport of a wheel chair as set forth in claim 72, wherein the track is positioned in a side wall to engage the track follower projecting from the control means of the wheel chair subsequent to operation of said control means extending the anchor means of the wheel chair, and wherein the track has openings to be exposed at the lower and upper platforms for the reception of and discharge of the track follower.

79. The escalator for transport of a wheel chair as set forth in claim 72, wherein the track is positioned in a side wall to engage the track follower projecting from the control means of the wheel chair subsequent to operation of said control means extending the anchor means of the wheel chair, wherein the track has openings to be exposed at the lower and upper platforms for the reception of and discharge of the track follower, and wherein a gate means at one of said track openings is actuated by engagement of the track follower in the track to control the speed of the motor means.

80. The escalator for transport of a wheel chair as set forth in claim 72, wherein the track is positioned in a side wall to engage the track follower projecting from the control means of the wheel chair subsequent to operation of said control means extending the anchor means of the wheel chair, wherein a first gate means is actuated by engagement of the track follower in the track operating motor control means to slow the speed of the motor means, and wherein a second gate means spaced in the direction of transport is actuated by engagement of the track follower in the track operating said motor means to restore the operating speed thereof.

81. The escalator for transport of a wheel chair as set forth in claim 72, wherein the track is positioned in a side wall to engage the track follower projecting from the control means of the wheel chair subsequent to operation of said control means extending the anchor means of the wheel chair, wherein the track has openings to be exposed at the lower and upper platforms for the reception of and discharge of the track follower, wherein a first gate means at one of said track openings is actuated by engagement of the track follower in the track operating motor control means to slow the speed of the motor means, and wherein a second gate means spaced in the direction of transport is actuated by engagement of the track follower in the track operating said motor means to restore the operating speed thereof.

82. The escalator for transport of a wheel chair as set forth in any one of claims 72 through 76 and 78 through 81, wherein a variably displaced track is independently cooperable with the track follower of the said wheel chair control means at each side wall of the escalator.

83. The escalator for transport of a wheel chair as set forth in any one of claims 68, 69, 70, 76, 79, 80, or 81, wherein a safety switch means is exposed to anchor means engagement with the supporting flight at the riser of the adjacent flight for engagement thereby and operable through the gate means and motor control means to restore the motor means speed.

84. The escalator for transport of a wheel chair as set forth in any one of claims 76, 79, 80 or 81, wherein the control means and track follower are independently cooperable with a safety switch means at each side wall of the escalator.

85. An escalator for the transport of a wheel chair having spaced side frames with spaced main and downwardly extensible front wheel supports and downwardly extensible anchor roller means and having control means with a track follower to depress said anchor roller means into engagement with supporting surfaces and to depress said front wheel supports and thereby maintain the horizontal disposition of the wheel chair during vertical displacement of a riser at adjacent escalator flights, and including;

side walls spaced to closely pass the side frames of the wheel chair, an endless belt of flights with risers extending between vertically spaced floor levels to move within the confines of the spaced side walls and each riser having a supporting surface comprised of longitudinally disposed upstanding ribs and a pocket adapted to receive said anchor roller means and formed therein at the riser of the next adjacent flight, lower and upper platforms with longitudinal fingers disposed between the said upstanding ribs of the flights passing beneath said platforms to intercept and discharge the anchor roller means from the pocket at said spaced floor levels and means to maintain a horizontal disposition of the flights as they are vertically offset by means to form steps and expose the risers at adjacent flights as they are propelled by motor means from one platform to the other, and a variably displaced track extending between the lower and upper platforms and engaged by the track follower of the said wheel chair control means operable to extend the anchor means of the wheel chair into engagement with a flight and adjacent riser and operable in response to said variable displacement of the track to maintain the horizontal disposition of the wheel chair with the main and front wheel supports carried upon adjacent flights separated vertically by said riser.

86. The escalator for transport of a wheel chair as set forth in claim 85, wherein the said fingers are pointed with an inclined plane extending from the bottom of the pockets intercepted thereby.

87. The escalator for transport of a wheel chair as set forth in claim 85, wherein the track is positioned in a side wall to engage the track follower projecting from the control means of the wheel chair subsequent to operation of said control means extending the anchor means of the wheel chair, and wherein a gate means in the track is actuated by engagement of the track follower in the track to slow the speed of the motor means to enable depression of the anchor roller means into the pocket.

88. The escalator for transport of a wheel chair as set forth in claim 87, wherein retractable ribs are withdrawn by means responsive to actuation of the gate means to form said pocket.

89. The escalator for transport of a wheel chair as set forth in claim 85, wherein a safety switch means is exposed in said pockets to be actuated by the anchor roller means when received therein, wherein the track is positioned in a side wall to engage the track follower projecting from the control means of the wheel chair subsequent to operation of said control means extending the anchor roller means of the wheel chair, and wherein a gate means in the track is actuated by engagement of the track follower in the track to slow the speed of the motor means to enable depression of the anchor roller means into the pocket and for actuation of the safety switch means operable through motor control means to restore the motor means to speed.

90. The escalator for transport of a wheel chair as set forth in claim 85, wherein the track is positioned in a side wall to engage the track follower projecting from the control means of the wheel chair subsequent to operation of said control means extending the anchor roller means of the wheel chair, wherein a first gate means in the track is actuated by engagement of the track follower in the track operating motor control means to slow the speed of the motor means and enable depression of the anchor roller means into the pocket, wherein a safety switch means is exposed in said pocket to be actuated by the anchor roller means when received therein, and wherein a second gate means in the track and spaced in the direction of transport is actuated by engagement of the track follower in the track and together with said safety switch means and through said motor control means operating to restore the operating speed thereof.

91. The escalator for transport of a wheel chair as set forth in claim 90, wherein retractable ribs are withdrawn by means responsive to actuation of said first gate means to form said pocket.

92. The escalator for transport of a wheel chair as set forth in any one of claims 87, 89, 90, or 91, wherein the control means and anchor roller means and gate means and track and track follower are independently cooperable at each side wall of the escalator.

93. The escalator for transport of a wheel chair as set forth in claim 85, wherein retractable ribs are withdrawn by means to form said pocket.

* * * * *